(12) United States Patent
Smydra et al.

(10) Patent No.: US 7,775,554 B2
(45) Date of Patent: Aug. 17, 2010

(54) AIR BAG MODULE VENT

(75) Inventors: Andrew J. Smydra, Rochester, MI (US); Annmarie McMillan, Romeo, MI (US); Molly K. Koenig, Imlay City, MI (US); Ramakrishnan Srinivasan, Sterling Heights, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 440 days.

(21) Appl. No.: 11/804,507

(22) Filed: May 18, 2007

(65) Prior Publication Data

US 2008/0284144 A1 Nov. 20, 2008

(51) Int. Cl.
*B60R 21/26* (2006.01)
(52) U.S. Cl. ..................... 280/736
(58) Field of Classification Search ............. 280/736, 280/739, 742, 743.2
See application file for complete search history.

(56) References Cited

U.S. PATENT DOCUMENTS

| | | | |
|---|---|---|---|
| 6,131,942 A * | 10/2000 | Fujii et al. ............ 280/728.2 |
| 6,406,055 B1 | 6/2002 | Faigle et al. | |
| 6,409,213 B2 * | 6/2002 | Webber et al. ............ 280/739 |
| 6,428,042 B1 | 8/2002 | Fischer et al. | |
| 6,588,795 B2 | 7/2003 | Fischer et al. | |
| 6,746,045 B2 | 6/2004 | Short et al. | |
| 6,773,030 B2 | 8/2004 | Fischer | |
| 6,877,772 B2 | 4/2005 | Fischer et al. | |
| 6,918,613 B2 | 7/2005 | Short et al. | |
| 7,040,654 B2 * | 5/2006 | Selfa et al. ............ 280/739 |
| 7,083,191 B2 | 8/2006 | Fischer | |
| 7,083,192 B2 | 8/2006 | Fischer et al. | |
| 7,275,761 B2 * | 10/2007 | Gould et al. ............ 280/742 |
| 7,364,192 B2 * | 4/2008 | Braun et al. ............ 280/739 |
| 7,448,646 B2 * | 11/2008 | Hall et al. ............ 280/739 |
| 2003/0189326 A1 | 10/2003 | Short et al. | |
| 2004/0051286 A1 | 3/2004 | Fischer et al. | |
| 2004/0188990 A1 | 9/2004 | Short et al. | |
| 2004/0232677 A1 * | 11/2004 | Fischer et al. ............ 280/739 |
| 2004/0251669 A1 | 12/2004 | Fischer et al. | |
| 2005/0040630 A1 | 2/2005 | Fischer et al. | |
| 2005/0127648 A1 | 6/2005 | Fischer et al. | |
| 2005/0248137 A1 | 11/2005 | Delventhal et al. | |
| 2006/0055159 A1 | 3/2006 | Fischer et al. | |
| 2006/0273562 A1 | 12/2006 | Fischer et al. | |
| 2006/0290117 A1 * | 12/2006 | Fischer et al. ............ 280/739 |
| 2007/0170709 A1 * | 7/2007 | Braun et al. ............ 280/739 |

FOREIGN PATENT DOCUMENTS

WO 2005/058654 6/2005

\* cited by examiner

*Primary Examiner*—Paul N Dickson
*Assistant Examiner*—Robert A Coker
(74) *Attorney, Agent, or Firm*—Tarolli, Sundheim, Covell & Tummino LLP

(57) ABSTRACT

An apparatus (10) for helping to protect an occupant (20) of a vehicle (24) includes an inflatable vehicle occupant protection device (14). An inflator (30) provides inflation fluid for inflating the protection device (14). A support member (80) supports the inflator (30) and the protection device (14). A retainer (120) helps secure the protection device (14) to the support member (80). At least one vent opening (132) formed in the retainer (120) enables flow of inflation fluid away from the protection device (14) through the support member (80).

27 Claims, 11 Drawing Sheets

AIR BAG MODULE VENT

FIELD OF THE INVENTION

The present invention relates to a vehicle occupant protection apparatus. In particular, the present invention relates to an air bag module including a vent for directing inflation fluid away from an air bag.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Frontal air bags may be driver frontal air bags or passenger frontal air bags. When inflated, the driver and passenger frontal air bags help protect the occupant from impacts with parts of the vehicle such as the instrument panel and/or a steering wheel of the vehicle.

Frontal air bag modules may include vents for directing inflation fluid away from the air bag. The vents may be adapted to vent inflation fluid depending on sensed or otherwise determined conditions, such as vehicle conditions, occupant conditions, or both. For example, a frontal air bag vent may be adapted to vent inflation fluid in response to whether an occupant is in a normally seated position or positioned away from the normally seated position when the air bag is deployed.

SUMMARY OF THE INVENTION

The present invention relates to an apparatus for helping to protect an occupant of a vehicle. The apparatus includes an inflatable vehicle occupant protection device and an inflator for providing inflation fluid for inflating the protection device. A support member supports the inflator and the protection device. A retainer helps secure the protection device to the support member. At least one vent opening formed in the retainer enables flow of inflation fluid away from the protection device through the support member.

The present invention also relates to an apparatus for helping to protect an occupant of a vehicle. The apparatus includes an inflatable vehicle occupant protection device and an inflator for providing inflation fluid for inflating the protection device. At least one vent opening directs inflation fluid away from the protection device. A vent member has a pre-deployment position prior to inflation of the protection device. The vent member is movable upon inflation of the protection device from the pre-deployment position to one of an open position permitting inflation fluid flow through the vent opening and a closed position at least partially blocking inflation fluid flow through the vent opening. The pre-deployment position is intermediate the closed position and the open position.

The present invention further relates to an air bag retainer for clamping a mouth portion of an air bag to a support member. The retainer includes a side wall that at least partially defines a central space. The side wall has a lower surface for engaging the mouth portion of the air bag. At least one vent opening extends through the side wall and is in fluid communication with the central space. The vent opening directs inflation fluid from an inflatable volume of the air bag through an opening in the support member.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF INVENTION

Figure 1:
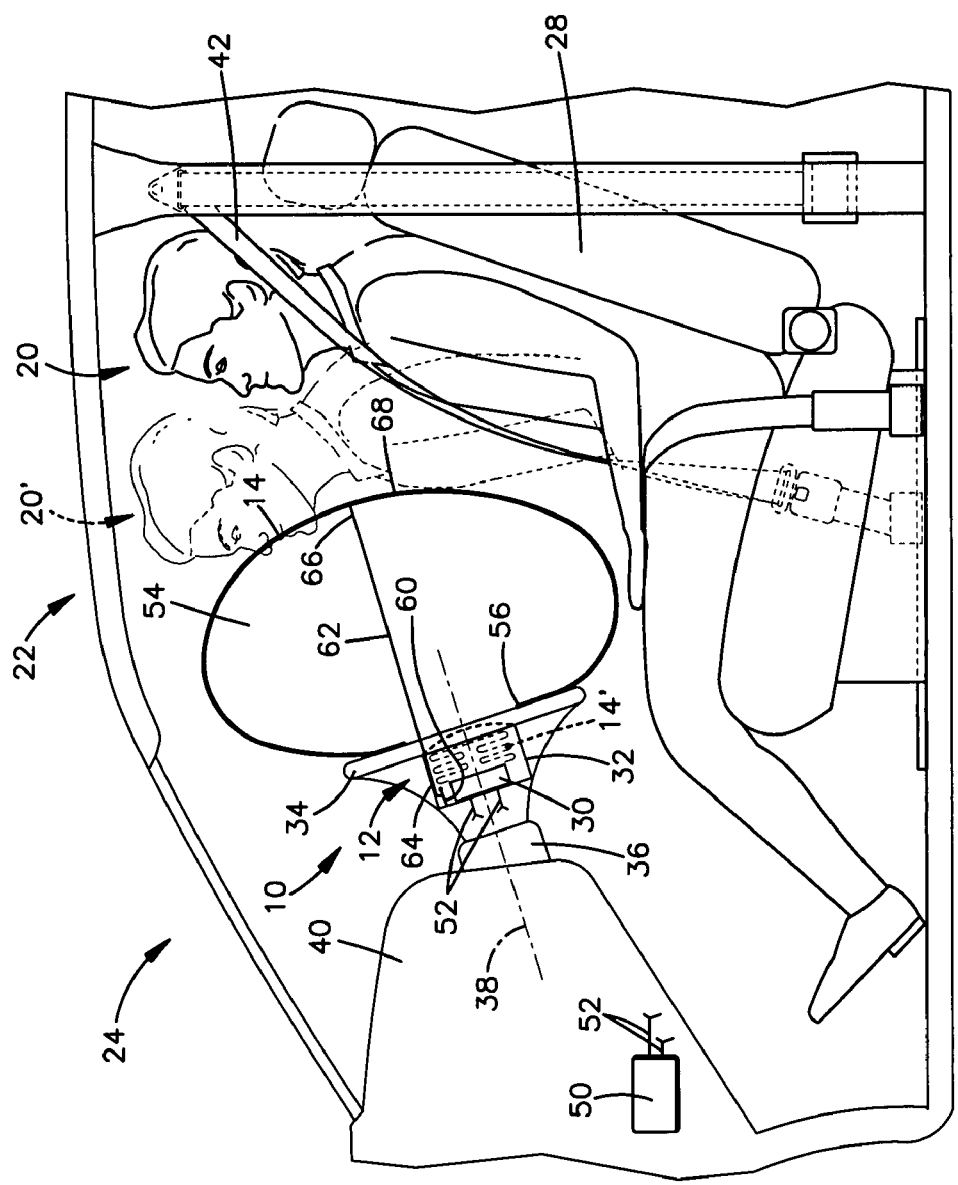
FIG. 1 is a schematic view of an apparatus for helping to protect an occupant of a vehicle illustrating the apparatus in a first deployed condition, according to the present invention.
Figure 2:
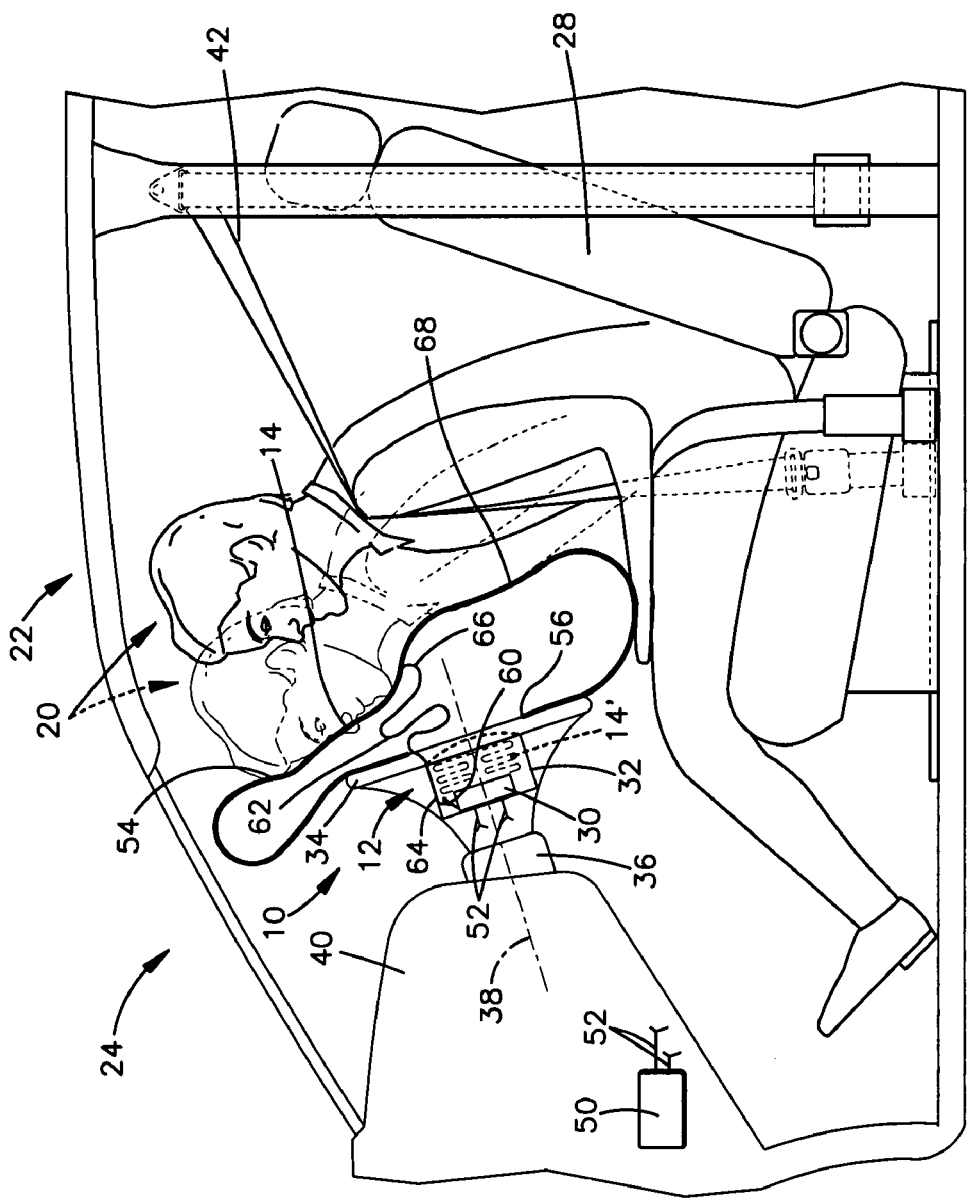
FIG. 2 is a schematic view of the apparatus of FIG. 1 illustrating the apparatus in a second deployed condition.

The present invention relates to an inflatable vehicle occupant protection device for helping to protect an occupant of a vehicle. More particularly, the present invention relates to a frontal air bag module having a vent. Referring to FIGS. 1 and 2, the apparatus 10 comprises a driver frontal air bag module 12 including a driver frontal air bag 14 for helping to protect an occupant 20 on a driver side 22 of a vehicle 24. In FIGS. 1 and 2, the occupant 20 is positioned in a seat 28 on the driver side 22 of the vehicle 24. Alternatively, the apparatus 10 could comprise a passenger frontal air bag module (not shown) including a passenger frontal air bag for helping to protect an occupant on a passenger side of the vehicle 24.

The air bag module 12 includes an inflator 30 and a housing 32. The air bag 14 has a stored condition, indicated by dashed lines in FIGS. 1 and 2 at 14', in which the air bag is folded, placed in the housing 32, and concealed within a cover 126. The air bag module 12 is connected to the steering wheel 34, steering column 36, or both for rotation with the steering wheel about a steering axis 38.

The inflator 30 is actuatable to provide inflation fluid for inflating the air bag 14. The inflator 30 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 30 is operatively connected to the sensor 50 via lead wires 52.

Upon sensing the occurrence of an event for which inflation of the air bag 14 is desired, the sensor 50 provides a signal to the inflator 30 via the lead wires 52. Upon receiving the signal from the sensor 50, the inflator 30 is actuated and provides inflation fluid through a mouth portion 56 of the air bag 14 to an inflatable volume 54 of the air bag in a known manner. The force of inflation fluid and the deploying air bag 14 opens the cover 126 and the air bag inflates from the stored condition away from the steering wheel 34 and an instrument panel 40 of the vehicle to a deployed condition illustrated in solid lines in FIGS. 1 and 2. The air bag 14, while inflated, helps protect the vehicle occupant 20 from impacts with parts of the vehicle 12, such as the steering wheel 34 and instrument panel 40.

The air bag module 12 includes one or more vents illustrated schematically at 60 in FIGS. 1 and 2. The vents 60 are actuatable to selectively direct inflation fluid away from the inflatable volume 54 of the air bag 14. The air bag module 12 includes a flexible elongated member 62, such as a tether, for selectively actuating the vent 60 based on the position of the occupant 20 in the vehicle 24. The tether 62 has a first end portion 64 secured to the vent 60 and an opposite second end portion 66 secured to an outer panel 68 of the air bag 14 opposite the mouth portion 56.

In FIG. 1, the occupant 20 is shown in a normally seated position, restrained by a seatbelt 42, at the time the event triggering inflation of the air bag 14 occurs. By "normally seated position," it is meant that the occupant 20 is positioned on the seat 28 in an upright manner and not leaned excessively forward, inboard, outboard, or a combination of these positions. If the event triggering inflation of the air bag 14 is a frontal impact, the normally seated occupant 20 moves from the normally seated position in a forward direction toward the instrument panel 40. At the same time, the air bag 14 inflates and deploys. Since the occupant 20 starts moving from the normally seated position, the air bag 14 inflates to a normally inflated position illustrated in FIG. 1. The occupant 20 thus moves into engagement with the normally inflated and positioned air bag 14 as shown generally in dashed lines at 20' in FIG. 1.

When the air bag 14 is in the normally inflated position of FIG. 1, the tether 62 is tensioned and actuates the vent 60 to a closed condition blocking inflation fluid flow through the vent. The vents 60, being closed when the air bag 14 is in the normally inflated position, helps the air bag 14 maintain a desired inflated pressure. Therefore, when the occupant 20 is in the normally seated position, the air bag 14 inflates and deploys with a desired speed and to a desired pressure. The air bag 14 may thus help protect the normally seated vehicle occupant 20 from impacts with the vehicle 12 and provide a desired ride down effect.

In FIG. 2, the occupant 20 is shown positioned away from the normally seated position at the time the event triggering inflation of the air bag 14 occurs. More specifically, in FIG. 2, the occupant 20 is leaned forward from the normal seating position at the time the event triggering inflation of the air bag 14 occurs. If the event triggering inflation of the air bag 14 is a frontal impact, the occupant 20 moves from the leaned-forward position in a forward direction toward the instrument panel 40. At the same time, the air bag 14 inflates and deploys. The occupant 20, being initially positioned away from the normally seated position, inhibits the air bag 14 from inflating to the normally inflated position (see FIG. 1).

When the air bag 14 is in the inflated position of FIG. 2, the tether 62 is slacked because the occupant 20 positioned away from the normally seated position blocks movement of the outer panel 68. As a result, the tether 62 does not actuate the vent 60, and the vent remains in an open condition permitting inflation fluid flow through the vent. The vent 60, remaining open due to the occupant 20 being positioned away from the normally seated position, helps reduce the inflated air bag 14 pressure. Therefore, when the occupant 20 is positioned away from the normally seated position, the air bag 14 inflates and deploys with a reduced speed and to a reduced pressure. The air bag 14 may thus help protect the vehicle occupant 20 positioned away from the normally seated position from impacts with the vehicle 12 and provide a desired ride down effect.

Figure 3:
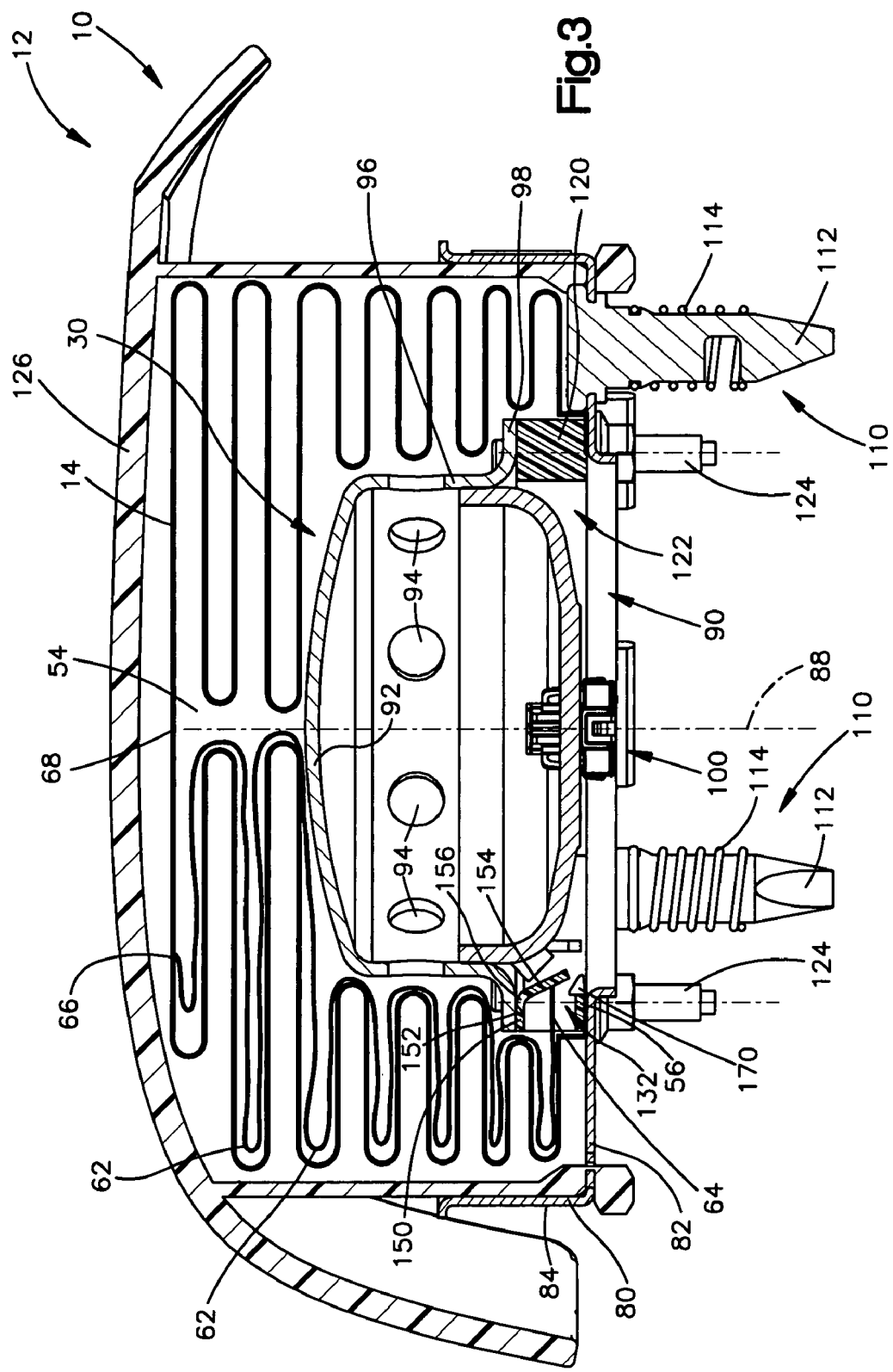
FIG. 3 is a sectional view of a portion of the apparatus of FIG. 1, according to a first embodiment of the present invention.

The air bag module 12 in accordance with the first embodiment of the present invention is shown in greater detail in FIG. 3. Referring to FIG. 3, the inflator 30 and the air bag 14 are supported on a support member 80, such as a reaction plate, configured and arranged to receive reaction forces associated with actuation of the inflator 30 and impacts with the air bag 14. The reaction plate 80 may comprise single piece of material, such as metal or plastic, that is formed to the illustrated configuration. The reaction plate 80 has a bottom plate portion 82 and a side wall 84 that extends transversely from a peripheral edge of the bottom plate portion. An exit opening 90 extends through the bottom plate portion 82 of the reaction plate 80.

The inflator 30 includes a housing 92 that has a generally cylindrical configuration and that is centered on a central axis 88. Outlet openings 94 extend through a side wall 96 of the housing 22 and are spaced about the circumference of the side wall. The inflator 16 also includes a radially extending mounting flange 98. The inflator 30 includes an initiator assembly 100 that is actuatable to actuate the inflator 30 in a known manner.

The air bag module 12 includes locking pin assemblies 110 for helping to secure the air bag module to the vehicle. Each pin assembly 110 includes a locking pin 112 and a spring 114 fitted over the pin. The locking pins 112 extend through and project downwardly from the bottom plate portion 82 of the reaction plate 80, as viewed in FIG. 3. The locking pins 112 are received in corresponding openings (not shown) in the steering wheel 34 or steering column 36 and snap or otherwise lock into place to secure the air bag module 12 to the vehicle 24. The springs 114 bias the air bag module 12 away from the steering wheel 34. The air bag module 12 thus "floats" on the springs 114 and may be urged against their spring bias toward the steering wheel 34. This allows the air bag module 12 to serve as an actuator for a horn switch (not shown).

The air bag module 12 includes an air bag retainer 120 that helps secure the air bag 14 to the reaction plate 80. The mouth portion 56 of the air bag 14 is positioned between the retainer 120 and the bottom plate portion 82 of the reaction plate 80, encircling the opening 90. The flange portion 98 of the inflator 30 is positioned on top of the retainer 120 such that the housing 92 is positioned in a central opening 122 of the retainer in alignment with the mouth portion 56 and the opening 90. The retainer 120 maintains clearance between the inflator 30 and the reaction plate 80 in a spaced from each other, thus defining a clearance between the inflator and reaction plate. Fastening means, such as threaded fasteners 124, extend through and fasten together the flange portion 98, retainer 120, mouth portion 56, and reaction plate 80. The air bag module 12 also includes the cover 126, which is secured to the reaction plate 80 and helps contain and conceal the air bag 14 in the folded and stored condition shown in FIG. 3.

Figure 4:
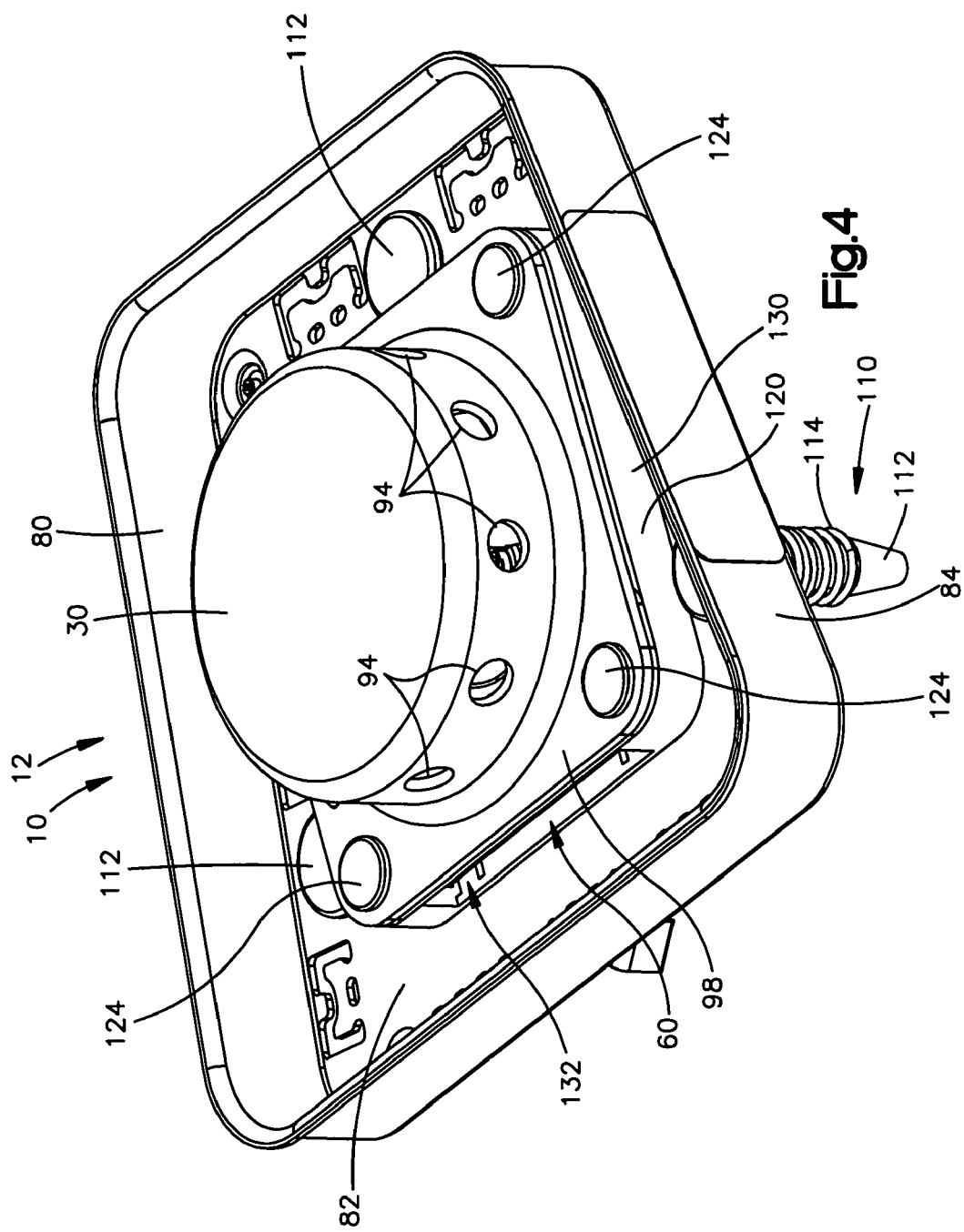
FIGS. 4 and 5 are perspective views of portions of the apparatus of FIG. 3.
Figure 5:
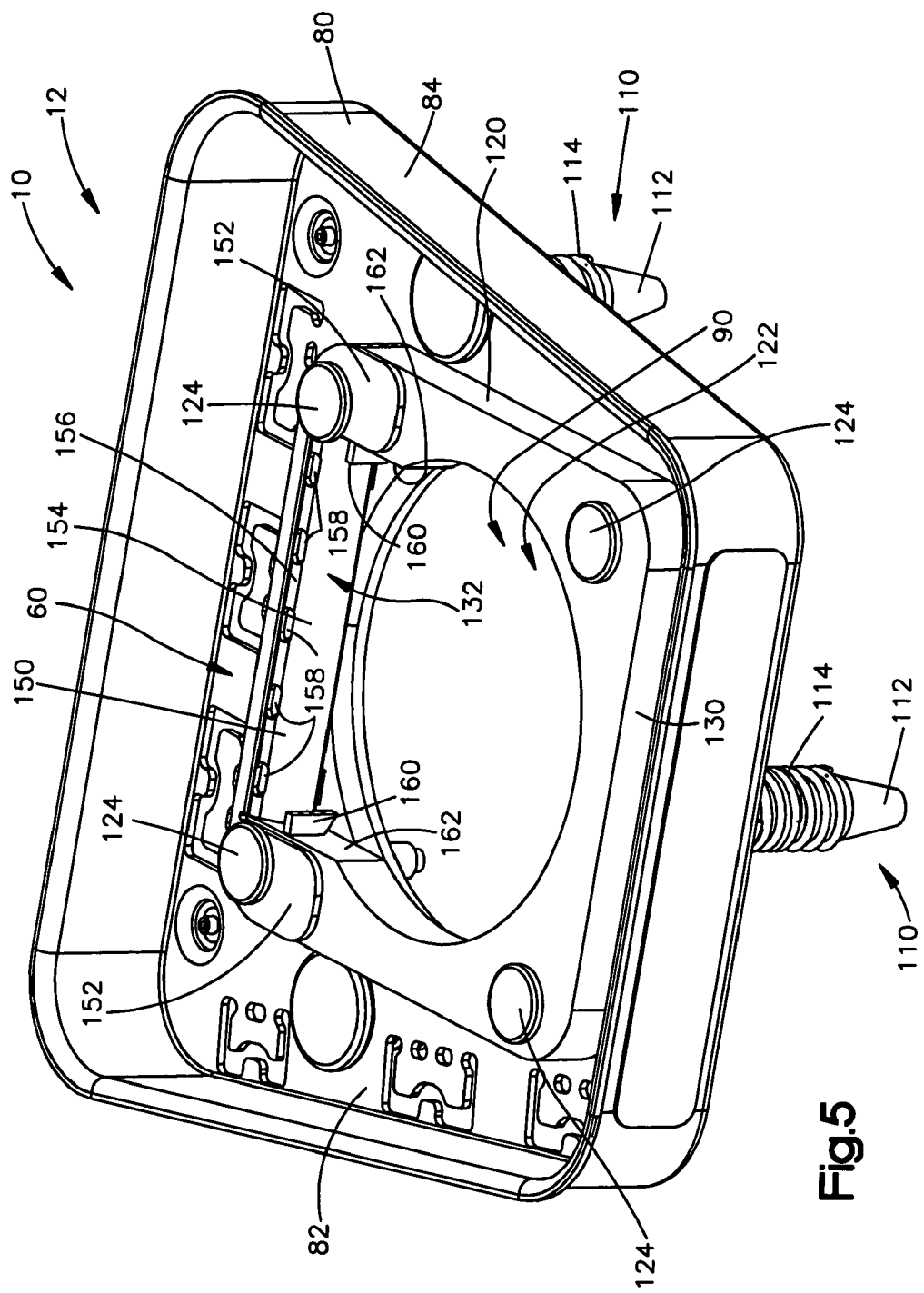
Figure 6:
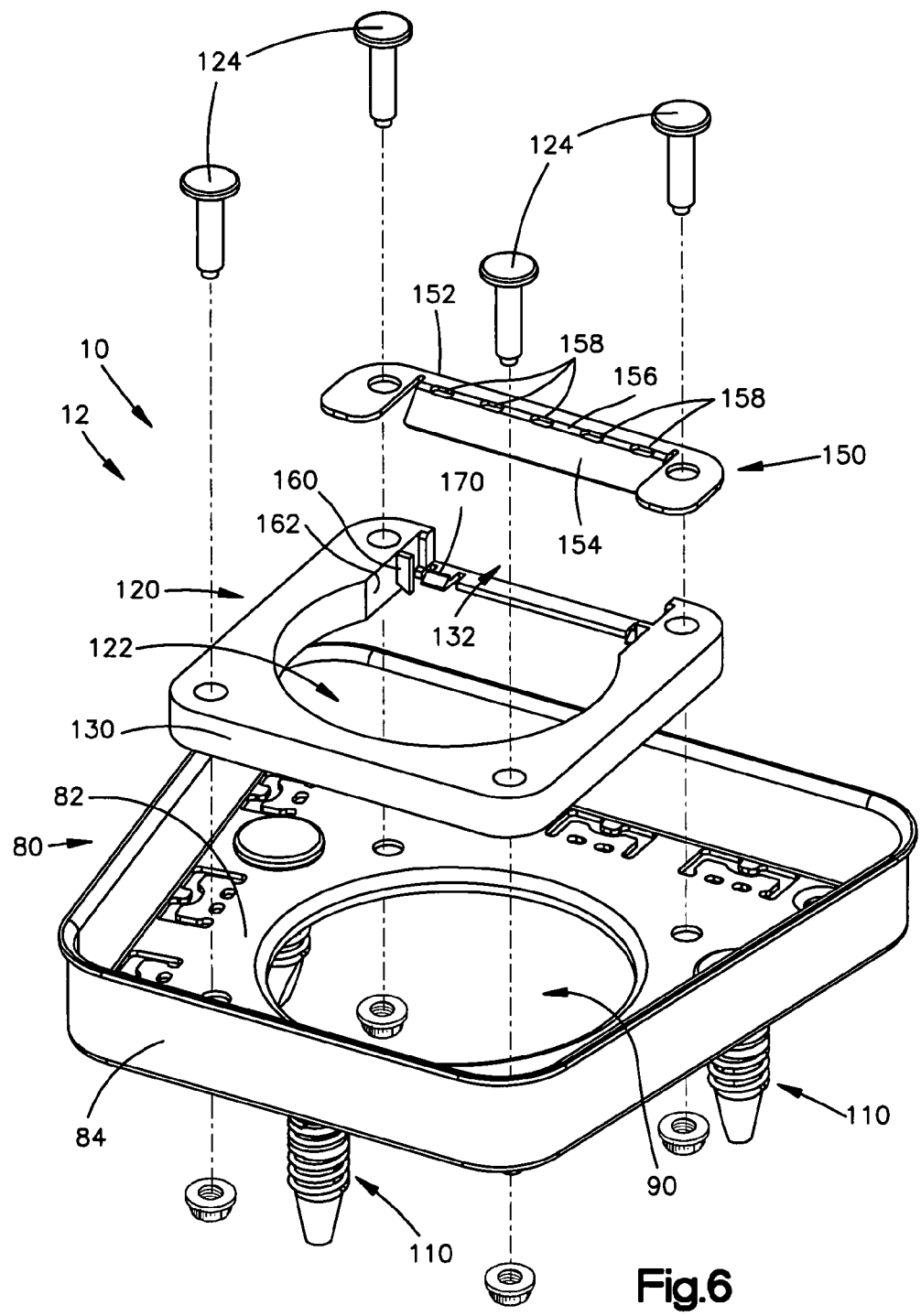
FIG. 6 is an exploded view of a portion of the apparatus of FIG. 3.

According to the first embodiment of the present invention, the retainer 120 and a vent member 150 help form the vent 60. Referring to FIGS. 4-6, the retainer 120 includes a side wall 130 that extends about the opening 122 in the retainer. The retainer 120 helps define a clearance between the side wall 130 and the inflator 30. A void or opening in the side wall 130 defines a vent opening 132 of the vent. The vent member 150 is positioned adjacent the vent opening 132 and secured to the air bag module 12, for example, by the fasteners 124.

The vent member 150 includes a base portion 152 and a door portion 154 connected to the base portion via a hinge portion 156. In the illustrated embodiment, the vent member 150 is constructed of a single piece of material, such as stamped metal. In this construction, the hinge portion 156 comprises a living hinge formed by openings 158 spaced along the junction between the base portion 152 and the door portion 154. The openings 158 weaken the structure of the hinge portion 156, allowing it to bend so that the door portion 154 can pivot relative to the base portion 152.

Figure 7:
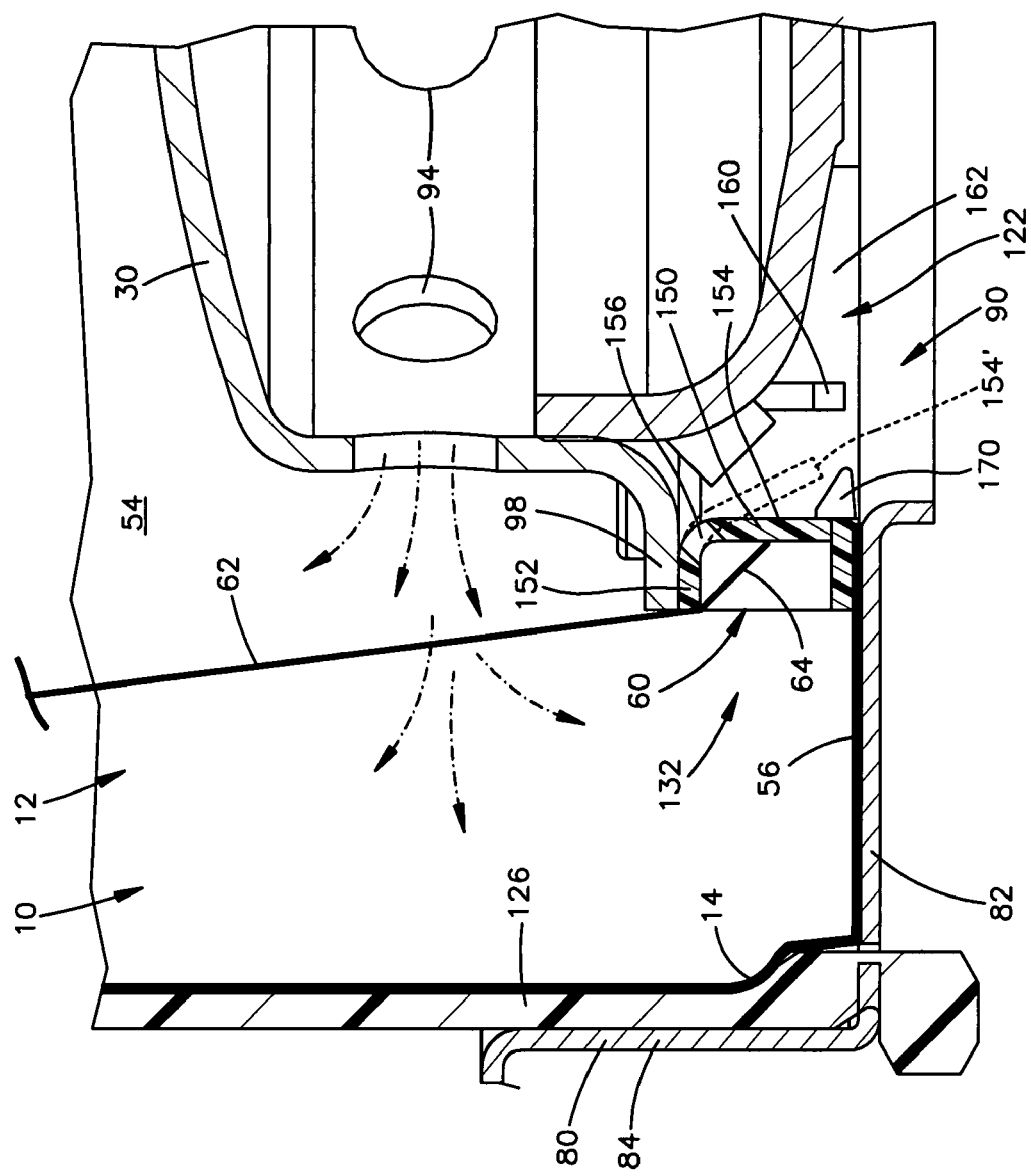
FIGS. 7 and 8 are magnified views illustrating portions of the apparatus of FIG. 3 in different conditions.
Figure 8:
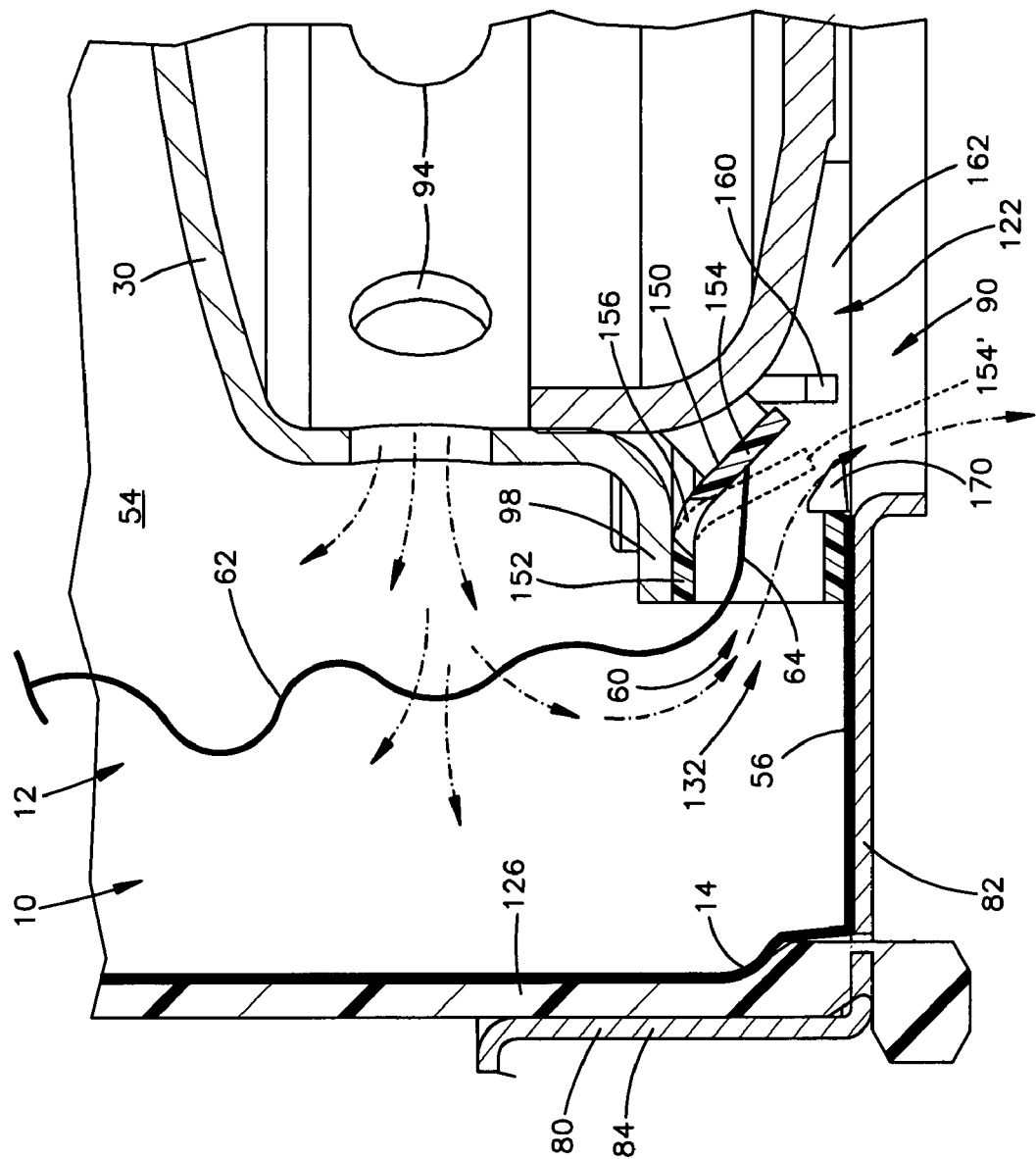

The vent opening 132 provides fluid communication between the inflatable volume 54 of the air bag 14 and the exterior of the air bag module 12 through the opening 90 via the clearance between the inflator 30 and the reaction plate 80. The vent member 150 is actuatable via the tether 62 selectively to permit inflation fluid flow through the vent opening 132 based on the seated position of the occupant, as described above in regard to FIGS. 1 and 2. This is detailed in FIGS. 7 and 8. FIG. 7 corresponds to the inflated and deployed condition of the air bag 14 illustrated in FIG. 1. FIG. 8 corresponds to the inflated and deployed condition of the air bag 14 illustrated in FIG. 2.

Referring to FIGS. 1 and 7, prior to inflation and deployment of the air bag 14, the vent member 150 is in a pre-deployment condition illustrated generally in dashed lines at 154' in FIG. 7. In the pre-deployment condition of the vent member 150, the door portion 154 is positioned between the closed position (shown in solid at 154 in FIG. 7) and the open position (shown in solid at 154 in FIG. 8). This mid-position of the door portion 154 in the pre-deployment condition of the vent member 150 may be advantageous because, to move the door portion to the open or closed position, the door portion need only be moved about half the full travel distance. The vent member 150 may thus be actuated quickly to the closed condition in response to the normally seated occupant or the open condition in response to the occupant positioned away from the normally seated position.

When the occupant 20 is in the normally seated position of FIG. 1 and the air bag 14 is inflated and deployed, the tether 62 is tensioned, as shown in FIG. 7. The first end portion 64 of the tether 62, being connected to the door portion 154, pulls on the door portion. As a result, the hinge portion 156 bends, allowing the door portion 154 to pivot from the pre-deployment position 154' to the closed position illustrated in solid lines at 154 in FIG. 7. In the closed position, the door portion 154 substantially or at least partially blocks inflation fluid flow through the vent opening 132. As shown in FIG. 7, latch members 170 (see also FIG. 6) may lock or otherwise maintain the door portion in the closed position. The latch members 170 may, for example, be formed in one piece with the retainer 120. The door portion 154, once latched in the closed condition, stays closed even if the tether later becomes slacked and the door portion is urged toward the open position by gas pressure in the air bag 14 during the event.

Referring to FIGS. 2 and 8, when the occupant 20 is positioned away from the normally seated position and the air bag 14 is inflated and deployed, the tether 62 remains slacked. As a result, the door portion 154 moves from the pre-deployment position 154' to the open position under the pressure of inflation fluid in the air bag 14. In the open position, the door portion 154' is positioned against or near stop members 160 (see also FIG. 5) that help limit pivotal movement of the door portion in the opening direction to that illustrated in FIG. 7. The stop members 160 may, for example, be formed in one piece with the retainer 120. The stop members 160 may project inward from opposing side walls 162 of the retainer 120 that help define the vent opening 132. The door portion 154, when in the open position, permits inflation fluid flow from the inflatable volume 54 through the vent opening 132 and through the opening 90 in the reaction plate 80 to outside the air bag module 12.

When the inflator 30 is actuated, inflation fluid is discharged in a generally radial direction through the outlet openings 94. As shown in FIGS. 7 and 8, inflation fluid is directed into the inflatable volume 54a of the air bag 14, thus causing the air bag to inflate and deploy. Inflation fluid is also directed toward the vent 60. If the vent 60 is in the closed condition (FIG. 7), inflation fluid is deflected or otherwise directed back toward the inflatable volume 54 and assists in inflation, deployment, and pressurization of the air bag 14. If the vent 60 is in the open condition (FIG. 8), inflation fluid is directed away from the inflatable volume 54 and exits or vents from the air bag module 12 through the vent opening 132 and the opening 90 in the reaction plate 80.

Those skilled in the art will appreciate that, regardless of whether the occupant is in the normally seated position (FIG. 1) or positioned away from the normally seated position (FIG. 2) at the time of inflation, the pressure and force of the inflation fluid directed into the air bag should be sufficient to open the cover 126. Not only should the cover 126 open regardless of the position of the occupant, the cover should open within a certain predetermined amount of time so that the air bag 14 can be deployed and pressurized. For example, factors may dictate that the cover 126 should open within 20 or 30 milliseconds after actuation of the inflator 30.

According to the present invention, the air bag module 12 has an advantageous configuration in which the structure defining the vent 60, e.g., the retainer 120 and the vent member 150, are positioned axially with the inflator 30. This positioning, as opposed to a configuration where the vent 60 and the structure defining the vent is positioned laterally of the inflator, provides several advantages, as set forth in the following paragraphs.

The axial arrangement of the inflator 30 relative to the vent 60 forces the inflation fluid to follow an indirect path when exiting or venting from the air bag module 12 through the vent. As shown by the dot-dashed arrows in FIG. 8, the inflation fluid exiting through the vent 60 is first directed radially outward, where it is deflected or otherwise redirected to reverse or substantially reverse (e.g., about 135-180 degrees) by the cover 126 and the side wall 84 of the reaction plate 80 toward the vent. This redirection creates a slight delay in actuation of the vent member 150, which helps maintain pressurization within the air bag module 12 at a level sufficient to ensure that the cover 126 will open within the requisite time. At the same time, or about the same time, inflation fluid acts on the vent member 150 to place the vent in the open condition and thereby vent inflation fluid from the air bag module 12 within the requisite time. According to the present invention, the delay in actuation of the vent member 150 is tailored so as to be insignificant to the opening of the vent 60 while sufficient to help ensure that the cover 126 opens reliably within the requisite time, regardless of whether the vent opens.

Also, the indirect path along which the inflation fluid travels to act on the vent member 150, particularly the door portion 154, helps maintain the integrity of the vent in the closed condition of FIG. 7. The inflation fluid traveling this indirect path to the door portion 154 improves the integrity and reliability with which the door portion seals the vent 60 when pulled to the closed condition by the tether 62. This helps ensure that the air bag 14 will provide the desired impact absorbing and ride down characteristics.

Further, the axial arrangement of the air bag module 12 provides a radially compact configuration better adapted for installation in a steering wheel mounted module where other components, such as steering wheel mounted controls, compete for space. While radial space on the steering wheel may be held at a premium, axial space may be more readily available. The axial configuration of the air bag module 12 takes advantage of this availability.

Figure 9:
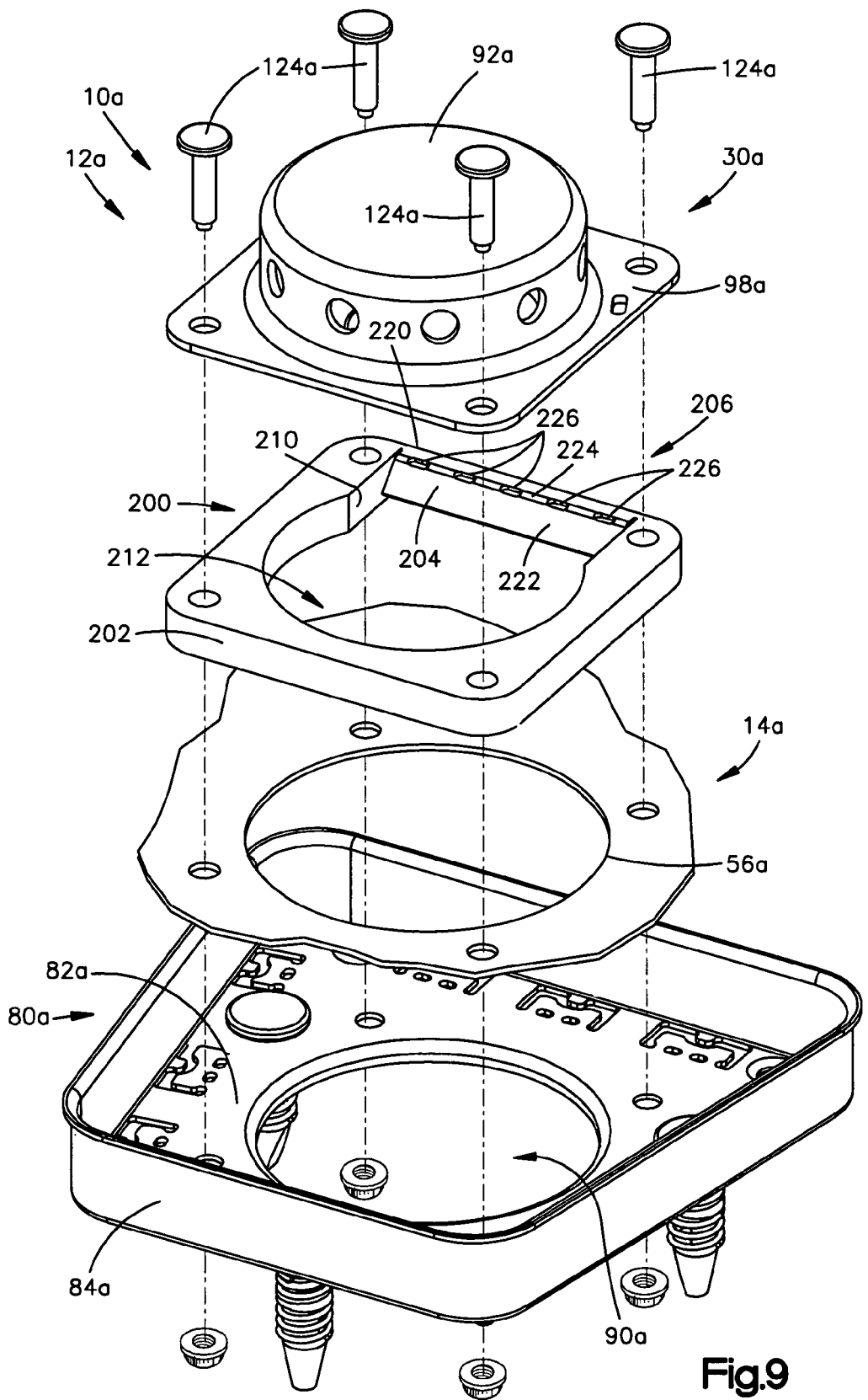
FIG. 9 is an exploded view of a portion of the apparatus, according to a second embodiment of the present invention.
Figure 10:
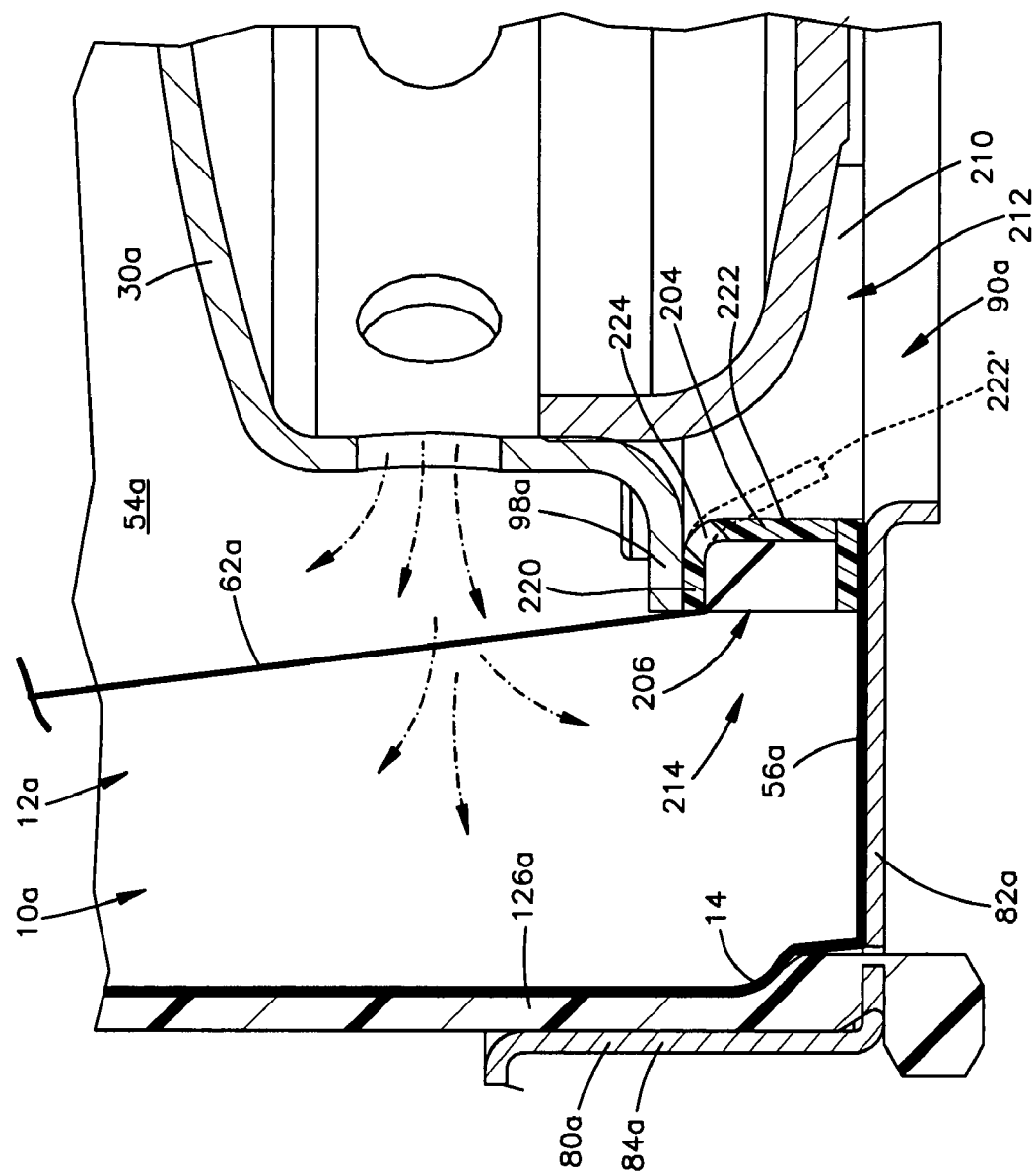
FIGS. 10 and 11 are magnified views illustrating portions of the apparatus of FIG. 9 in different conditions.
Figure 11:
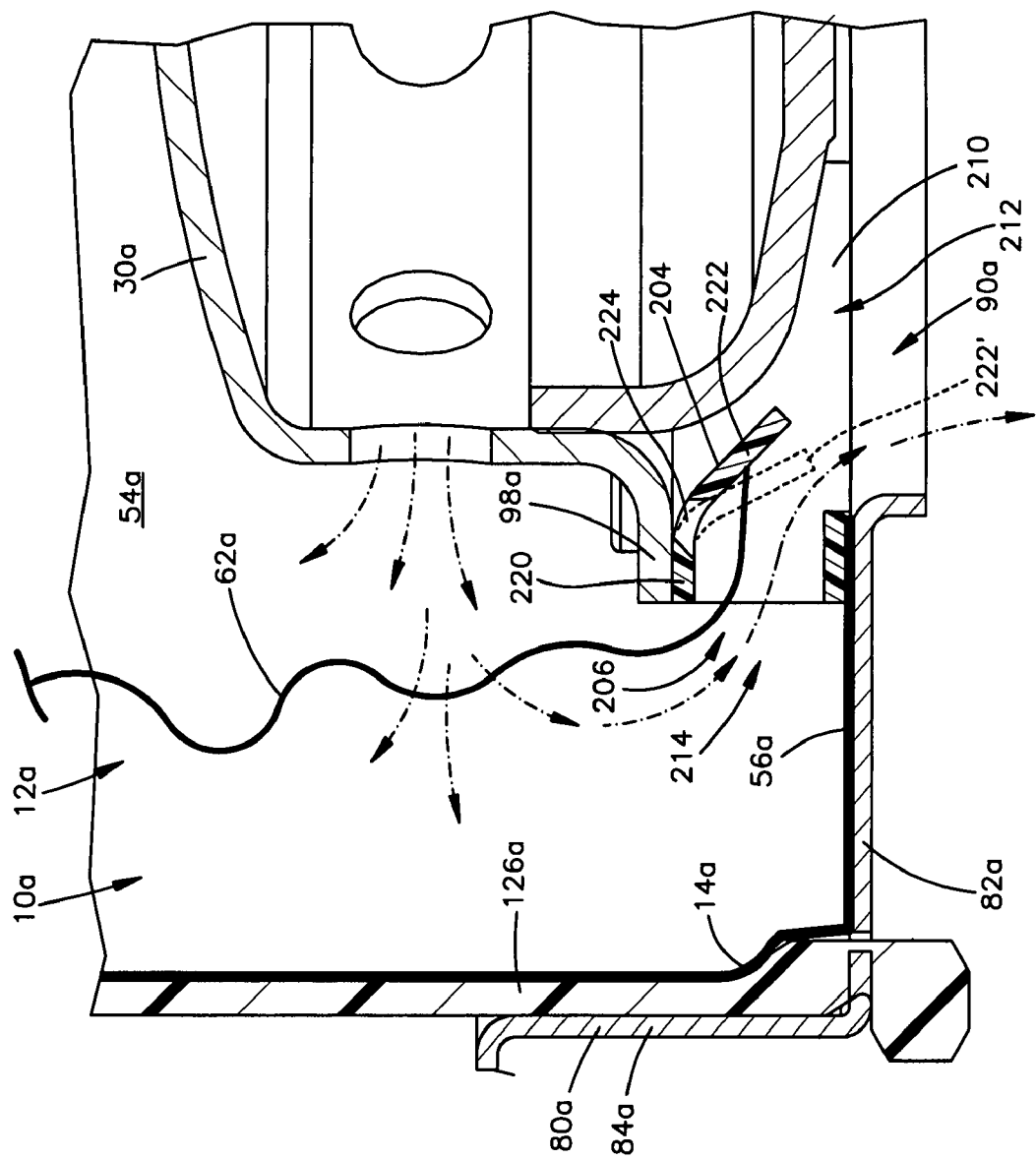

A second embodiment of the present invention is illustrated in FIGS. 9-11. The second embodiment of the invention is similar to the first embodiment of the invention illustrated in FIGS. 1-8. Accordingly, numerals similar to those of FIGS. 1-8 will be utilized in FIGS. 9-11 to identify similar components, the suffix letter "a" being associated with the numerals of FIG. 9-11 to avoid confusion.

Referring to FIG. 9, the apparatus 10a includes an air bag module 12a. The air bag module 12a includes a support member 80a, such as a reaction plate. The reaction plate 80a may comprise single piece of material, such as metal or plastic, that is formed to the illustrated configuration. The reaction plate 80a has a bottom plate portion 82a and a side wall 84a that extends transversely from a peripheral edge of the bottom plate portion. An exit opening 90a extends through the bottom plate portion 82a of the reaction plate 80a.

The air bag module 12a also includes an air bag retainer 200 that helps secure the air bag 14a to the reaction plate 80a. The mouth portion 56a of the air bag 14a is positioned between the retainer 200 and the bottom plate portion 82a of the reaction plate 80a, encircling the opening 90a. The flange portion 98a of the inflator 30a is positioned on top of the retainer 200 such that the housing 92a is positioned in a central opening 212 of the retainer in alignment with the mouth portion 56a and the opening 90a. Fastening means, such as threaded fasteners 124a, extend through and fasten together the flange portion 98a, retainer 200, mouth portion 56a, and reaction plate 80a. The air bag module 12a includes a cover (not shown in FIG. 9) that can be secured to the reaction plate 80a to help contain and conceal the air bag 14a in the folded and stored condition in a manner similar or identical to that shown in the first embodiment of FIG. 3.

According to the second embodiment of the present invention, the retainer 200 includes a retainer portion 202 and a vent member 204 that together help form a vent 206. The retainer portion 202 helps secure the mouth portion 56a of the air bag 14a to the reaction plate 80a. The retainer portion 202 includes a side wall 210 that helps define the opening 212 in the retainer 200. A void or opening in the side wall 210 defines a vent opening 214 of the vent 206. The vent member 204 is located adjacent the vent opening 214.

The vent member 204 includes a base portion 220 and a door portion 222 connected to the base portion via a hinge portion 224. According to the second embodiment of the present invention, the retainer portion 202 and the vent member 204 are constructed of a single piece of material, such as stamped metal. In this construction, the base portion 220 of the vent member 204 merges with the retainer portion 202. The hinge portion 224 comprises a living hinge formed by openings 226 spaced along the junction between the base portion 220 and the door portion 222. The openings 226 weaken the structure of the hinge portion 224, allowing it to bend so that the door portion 222 can pivot relative to the base portion 220.

The vent opening 214 provides fluid communication between the inflatable volume of the air bag 14a and the exterior of the air bag module 12a through the opening 90a via the clearance between the inflator 30a and the reaction plate 80a. The vent member 204 is actuatable via the tether 62a selectively to permit inflation fluid flow through the vent opening 214 based on the seated position of the occupant. This is illustrated in FIGS. 10 and 11

Referring to FIG. 10, prior to inflation and deployment of the air bag 14a, the vent member 204 is in a pre-deployment condition in which the door portion is illustrated generally in dashed lines at 222'. In the pre-deployment condition of the vent member 204, the door portion 222' is positioned between the closed position (shown in solid at 222 in FIG. 10) and the open position (shown in solid at 222 in FIG. 11). This mid-position of the door portion 222 in the pre-deployment condition of the vent member 204 may be advantageous because, to move the door portion to the open or closed position, the door portion need only be moved about half the full travel distance. The vent member 204 may thus be actuated quickly to the closed condition in response to the normally seated occupant or the open condition in response to the occupant positioned away from the normally seated position.

When the occupant is in the normally seated position (see FIG. 1) and the air bag 14a is inflated and deployed, the tether 62a is tensioned, as shown in FIG. 10. The tether 62a, being connected to the door portion 222, pulls on the door portion. As a result, the hinge portion 224 bends, allowing the door portion 222 to pivot from the pre-deployment position 222' to the closed position illustrated in solid lines at 222 in FIG. 10. In the closed position, the door portion 222 substantially or at least partially blocks inflation fluid flow through the vent opening 214. The air bag module 12a may include latch members (not shown), similar or identical to those described above and illustrated in FIGS. 6 and 7, that lock or otherwise maintain the door portion in the closed position. In this configuration, the door portion 222, once latched in the closed condition, stays closed even if the tether 62a later becomes slacked and the door portion is urged toward the open position by gas pressure in the air bag 14a during the event.

Referring to FIG. 11, when the occupant is positioned away from the normally seated position and the air bag 14a is inflated and deployed, the tether 62a remains slacked. As a result, the door portion 222 moves from the pre-deployment position 222' to the open position under the pressure of inflation fluid in the air bag 14a. The door portion 222, when in the open position, permits inflation fluid flow from the inflatable volume 54a through the vent opening 214 and through the opening 90a in the reaction plate 80a to outside the air bag module 12a. The air bag module 12a may include stop members (not shown), similar or identical to those described above and illustrated in FIGS. 6 and 7, against which the door portion rest while in the open position. The stop members help limit pivotal movement of the door portion 222 in the opening direction.

The air bag module 12a of the second embodiment has an advantageous configuration similar or identical to that described above in regard to the first embodiment. The vent 214, defined by the vent member 204 of the retainer 200, being positioned axially with respect to the inflator 30a, provides several advantages.

The axial arrangement of the inflator 30a relative to the vent 214 forces the inflation fluid to follow an indirect path when exiting or venting from the air bag module 12a. As shown by the dot-dashed arrows in FIG. 11, the inflation fluid exiting through the vent 214 is first directed radially outward, where it is deflected or otherwise redirected to reverse or substantially reverse (e.g., about 135-180 degrees) by the cover 126a and the side wall 84a of the reaction plate 80a toward the vent. This redirection creates a slight delay in actuation of the vent member 204, which helps maintain pressurization within the air bag module 12a at a level sufficient to ensure that the cover 126a will open within the requisite time. At the same time, or about the same time, inflation fluid acts on the vent member 204 to place the vent 214 in the open condition and thereby vent inflation fluid from the air bag module 12a within the requisite time. According to the present invention, the delay in actuation of the vent member 204 is tailored so as to be insignificant to the opening of the vent 214 while sufficient to help ensure that the cover 126a opens reliably within the requisite time, regardless of whether the vent opens.

Also, the indirect path along which the inflation fluid travels to act on the vent member 204, particularly the door portion 222, helps maintain the integrity of the vent in the closed condition of FIG. 10. The inflation fluid traveling this indirect path to the door portion 222 improves the integrity and reliability with which the door portion seals the vent 214 when pulled to the closed condition by the tether 62a. This helps ensure that the air bag 14a will provide the desired impact absorbing and ride down characteristics.

Further, the axial arrangement of the air bag module 12a provides a radially compact configuration better adapted for installation in a steering wheel mounted module where other components, such as steering wheel mounted controls, compete for space. While radial space on the steering wheel may be held at a premium, axial space may be more readily available. The axial configuration of the air bag module 12a takes advantage of this availability.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for helping to protect an occupant of a vehicle, the apparatus comprising:
an inflatable vehicle occupant protection device;
an inflator for providing inflation fluid for inflating the protection device;
a support member for supporting the inflator and the protection device; and
a retainer for securing the protection device to the support member, the retainer comprising at least one vent opening for enabling flow of inflation fluid away from the protection device through the support member, the retainer being positioned between the inflator and the support member and spacing the inflator from the support member to maintain a clearance through which inflation fluid may flow from the at least one vent opening to an exit opening.

2. The apparatus recited in claim 1, further comprising a vent member movable to an open condition enabling flow of inflation fluid away from the protection device through the vent opening and to a closed condition at least partially blocking flow of inflation fluid away from the protection device through the at least one vent opening.

3. The apparatus recited in claim 2, wherein the vent member has a pre-deployment condition intermediate the open condition and the closed condition.

4. The apparatus recited in claim 2, wherein the support member comprises an exit opening in fluid communication with the at least one vent opening, inflation fluid flowing from an inflatable volume of the protection device through the at least one vent opening and through the exit opening when the vent member is in the open condition.

5. The apparatus recited in claim 4, wherein the exit opening receives at least a portion of the inflator.

6. The apparatus recited in claim 5, wherein the retainer encircles a portion of the inflator, a clearance being defined between the inflator and the support member by the retainer, inflation fluid passing through the at least one vent opening, through the clearance, and through the exit opening when the vent member is in the open condition.

7. The apparatus recited in claim 2, wherein the support member and the inflator define a clearance that is maintained by the retainer, inflation fluid passing through the at least one vent opening and venting through the clearance when the vent member is in the open condition.

8. The apparatus recited in claim 2, further comprising at least one fastener that extends through and interconnects the inflator, the retainer, the protection device, and the support member.

9. The apparatus recited in claim 8, wherein the vent member comprises a component separate from the retainer and the support member, the at least one fastener extending through the vent member.

10. The apparatus recited in claim 9, wherein the vent member is clamped between the inflator and the retainer.

11. The apparatus recited in claim 2, further comprising a flexible elongated member associated with the protection device and the vent member, the flexible elongated member being operative to move the vent member to the closed condition in response to deployment of the protection device.

12. The apparatus recited in claim 2, wherein the vent member comprises a base portion and a door portion supported for pivotal movement relative to the base portion by a hinge portion.

13. The apparatus recited in claim 12, wherein the vent member has a construction stamped from a single piece of material, the hinge portion comprising a living hinge defined at least partially by a plurality of spaced apertures in the vent member.

14. The apparatus recited in claim 2, wherein the vent member is movable to the open position in response to fluid pressure in the protection device.

15. The apparatus recited in claim 2, wherein the vent member comprises a portion of the retainer.

16. The apparatus recited in claim 15, wherein the vent member comprises a door portion and a hinge portion that connects the door portion to the retainer.

17. An apparatus for helping to protect an occupant of a vehicle, the apparatus comprising:
an inflatable vehicle occupant protection device;
an inflator for providing inflation fluid for inflating the protection device;
at least one vent opening for directing inflation fluid away from the protection device; and
a vent member having a pre-deployment position prior to inflation of the protection device, the vent member being movable upon inflation of the protection device from the pre-deployment position to one of an open position permitting inflation fluid flow through the at least one vent opening and a closed position at least partially blocking inflation fluid flow through the at least one vent opening, the pre-deployment position being intermediate the closed position and the open position, wherein the vent member has a construction stamped from a single piece of material, the vent member comprising a base portion and a door portion supported for pivotal movement relative to the base portion by a hinge portion comprising a living hinge defined at least partially by a plurality of spaced apertures in the vent member.

18. The apparatus recited in claim 17, wherein the vent member is movable to the closed position in response to tension on a flexible elongated member connecting the vent member to the protection device.

19. The apparatus recited in claim 17, wherein the vent member is movable to the open position in response to fluid pressure in the protection device.

20. The apparatus recited in claim 17, further comprising a support member and a retainer for securing the protection device to the support member, the at least one vent opening comprising at least one opening in the retainer.

21. The apparatus recited in claim 17, wherein the vent member comprises a portion of a retainer for helping to secure the inflatable vehicle occupant protection device to a support member.

22. An air bag retainer for clamping an air bag to a support member, the air bag retainer comprising:
- a side wall that at least partially defines a central space, the side wall having a lower surface for engaging the air bag; and
- at least one vent opening extending through the side wall and being in fluid communication with the central space, the at least one vent opening directing inflation fluid from an inflatable volume of the air bag through at least one opening in the support member; and
- a vent member movable to an open condition enabling flow of inflation fluid away from the protection device through the vent opening and to a closed condition at least partially blocking the opening in the side wall to at least partially flow of inflation fluid away from the protection device through the at least one vent opening, the vent member comprising a base portion and a door portion supported for pivotal movement relative to the base portion by a hinge portion.

23. The air bag retainer recited in claim 22, wherein the central space is adapted to receive at least a portion of an inflator.

24. The air bag retainer recited in claim 22, wherein the vent member has a construction stamped from a single piece of material, the hinge portion comprising a living hinge defined at least partially by a plurality of spaced apertures in the vent member.

25. The air bag retainer recited in claim 24, wherein the vent member is stamped with the retainer as a single piece of material.

26. An air bag retainer for clamping an air bag to a support member, the air bag retainer comprising:
- a side wall that at least partially defines a central space, the side wall having a lower surface for engaging the air bag; and
- at least one vent opening extending through the side wall and being in fluid communication with the central space, the at least one vent opening directing inflation fluid from an inflatable volume of the air bag through at least one opening in the support member, wherein the side wall has an upper surface opposite the lower surface, the upper surface being adapted to engage and support the inflator.

27. An apparatus for helping to protect an occupant of a vehicle, the apparatus comprising:
- an inflatable vehicle occupant protection device;
- an inflator for providing inflation fluid for inflating the protection device;
- a support member for supporting the inflator and the protection device; and
- a retainer positioned between the inflator and the support member, the retainer clamping the protection device to the support member and supporting the inflator on the support member, the retainer maintaining a clearance between the inflator and the support member through which inflation fluid vent away from the protection device.

* * * * *